(12) United States Patent
Geisel

(10) Patent No.: US 9,578,860 B2
(45) Date of Patent: Feb. 28, 2017

(54) FLY REEL WITH RATCHETING DRAG SYSTEM

(71) Applicant: ALLEN FLY FISHING, Southlake, TX (US)

(72) Inventor: Justin Geisel, Haslett, MI (US)

(73) Assignee: ALLEN FLY FISHING LLC, Southlake, TX (US)

( * ) Notice: Subject to any disclaimer, the term of this patent is extended or adjusted under 35 U.S.C. 154(b) by 328 days.

(21) Appl. No.: 14/192,454

(22) Filed: Feb. 27, 2014

(65) Prior Publication Data

US 2015/0053806 A1  Feb. 26, 2015

Related U.S. Application Data

(60) Provisional application No. 61/869,246, filed on Aug. 23, 2013.

(51) Int. Cl.
| | | |
|---|---|---|
| *A01K 89/01* | (2006.01) | |
| *A01K 89/033* | (2006.01) | |
| *A01K 89/016* | (2006.01) | |

(52) U.S. Cl.
CPC .......... *A01K 89/033* (2013.01); *A01K 89/016* (2013.01); *Y10T 29/49817* (2015.01)

(58) Field of Classification Search
CPC .. A01K 89/016; A01K 89/033; A01K 89/057; A01K 89/004
See application file for complete search history.

(56) References Cited

U.S. PATENT DOCUMENTS

| | | | |
|---|---|---|---|
| 2,130,671 A | | 9/1938 | Maynes |
| 2,220,017 A | * | 10/1940 | Maynes ............... A01K 89/016 |
| | | | 242/256 |
| 2,344,209 A | | 3/1944 | Lowe |
| 2,459,963 A | | 1/1949 | Roark |
| 2,561,935 A | | 7/1951 | McCash |
| 2,714,271 A | | 8/1955 | Stratton |
| 3,136,497 A | * | 6/1964 | Wood, Jr. ............. A01K 89/016 |
| | | | 242/270 |
| 3,315,913 A | * | 4/1967 | Grieten ................ A01K 89/033 |
| | | | 242/271 |
| 3,432,114 A | | 3/1969 | Meisner |
| 3,476,322 A | | 11/1969 | Sutz |
| 3,478,976 A | * | 11/1969 | Sarah ................... A01K 89/016 |
| | | | 242/270 |
| 3,697,012 A | * | 10/1972 | Walker ................. A01K 89/016 |
| | | | 242/295 |
| 3,741,493 A | | 6/1973 | Jones |
| 3,958,771 A | * | 5/1976 | Everett ................ A01K 89/016 |
| | | | 242/292 |
| 3,989,204 A | | 11/1976 | Lemery |
| 4,278,217 A | | 7/1981 | Blackwell |
| 4,352,474 A | | 10/1982 | Kovalovsky |

(Continued)

*Primary Examiner* — Emmanuel M Marcelo
(74) *Attorney, Agent, or Firm* — Vedder Price P.C.

(57) ABSTRACT

A drag system for use on a fishing reel includes a shaft and a drag unit rotatably located on the shaft and including at least one pawl that extends beyond an outer diameter of a cover of the drag unit. The drag system also includes a housing with an internal gear wherein the housing is connected to the shaft and covers the drag unit such that the at least one pawl interacts with the internal gear to restrict rotation of the housing about the shaft in one direction.

8 Claims, 6 Drawing Sheets

(56) References Cited

U.S. PATENT DOCUMENTS

| | | | | |
|---|---|---|---|---|
| 4,708,303 A | * | 11/1987 | Emura | A01K 89/033 242/300 |
| 4,715,555 A | * | 12/1987 | McChristian, Jr. | A01K 89/016 242/295 |
| 4,728,054 A | | 3/1988 | Pisapio | |
| 4,750,687 A | * | 6/1988 | Sievert | A01K 89/016 242/295 |
| 4,779,819 A | | 10/1988 | Emura et al. | |
| 4,815,676 A | | 3/1989 | Young | |
| 4,832,278 A | * | 5/1989 | Sugeta | A01K 89/016 188/82.2 |
| 4,881,698 A | | 11/1989 | Doiron | |
| 4,958,785 A | | 9/1990 | Aoki | |
| 5,199,682 A | | 4/1993 | James | |
| 5,299,757 A | | 4/1994 | Sugawara | |
| 5,590,847 A | | 1/1997 | Ament | |
| 5,609,309 A | | 3/1997 | Oh | |
| 5,752,667 A | * | 5/1998 | Merrill | A01K 89/016 242/296 |
| 5,857,632 A | * | 1/1999 | Arkowski | A01K 89/016 192/45.018 |
| 6,073,870 A | | 6/2000 | Shinohara et al. | |
| 6,155,508 A | * | 12/2000 | Lepage | A01K 89/016 242/295 |
| 6,164,576 A | | 12/2000 | Takahashi | |
| 6,513,743 B1 | | 2/2003 | Perkins, Jr. et al. | |
| 6,964,389 B2 | | 11/2005 | Hill et al. | |
| 7,163,167 B2 | * | 1/2007 | Ikuta | A01K 89/027 242/247 |
| 8,353,638 B2 | | 1/2013 | Arnott | |
| 8,368,271 B2 | | 2/2013 | Wiggins | |
| 2002/0020772 A1 | * | 2/2002 | Norris | A01K 89/016 242/282 |
| 2003/0136866 A1 | * | 7/2003 | Kitajima | A01K 89/01 242/307 |
| 2003/0150947 A1 | | 8/2003 | Hong | |
| 2006/0138267 A1 | * | 6/2006 | Ikuta | A01K 89/033 242/245 |
| 2013/0134810 A1 | | 5/2013 | Gray | |
| 2013/0192915 A1 | | 8/2013 | Versteyhe et al. | |
| 2013/0193788 A1 | | 8/2013 | Arihara et al. | |
| 2013/0199314 A1 | | 8/2013 | Habibvand et al. | |
| 2013/0228040 A1 | | 9/2013 | Anderson | |
| 2013/0238213 A1 | | 9/2013 | Jensen | |
| 2013/0239743 A1 | | 9/2013 | Liu et al. | |
| 2013/0244537 A1 | | 9/2013 | Lennon | |
| 2013/0255437 A1 | | 10/2013 | Hull et al. | |
| 2013/0255618 A1 | | 10/2013 | Hwang et al. | |
| 2013/0264914 A1 | | 10/2013 | Kalev | |

* cited by examiner

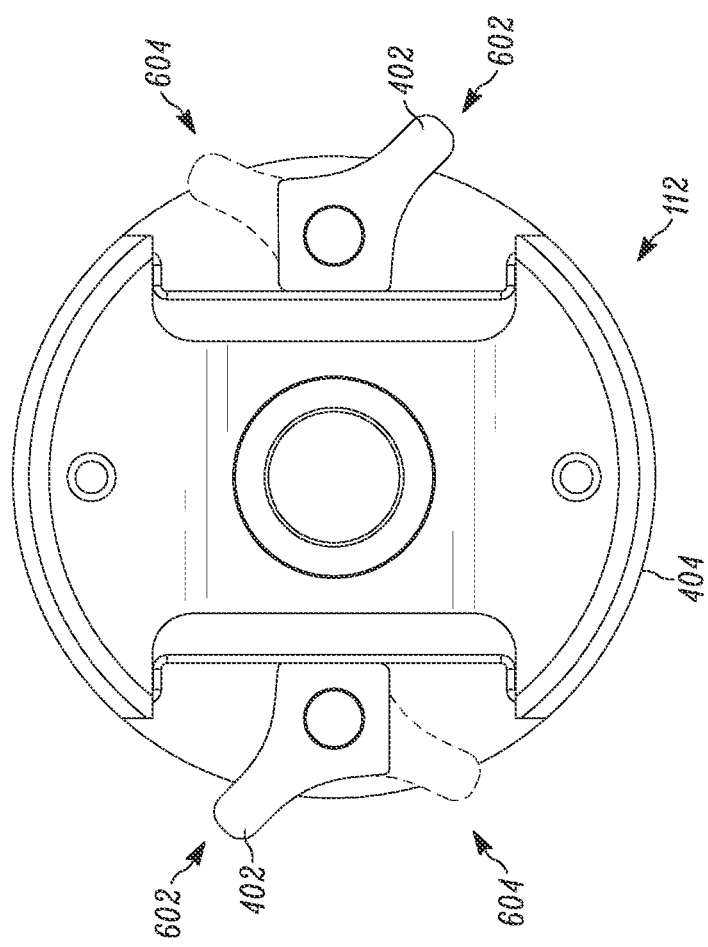

FLY REEL WITH RATCHETING DRAG SYSTEM

RELATED APPLICATIONS

This application is based on and claims priority to provisional U.S. Patent Application No. 61/869,246 filed Aug. 23, 2013, the contents of which are herein incorporated by reference.

BACKGROUND

Fishing reels, and in particular, fly fishing reels typically include drag systems that limit or restrict the rotational speed of a spool of the fishing reel. Drag systems are often used on fishing reels to vary the force required to pull fishing line off of a spool of a fishing reel as the line unwinds from the spool. The drag system also allows the user to rotate the spool in the opposite direction so that a user can retrieve the fishing line by winding the line back onto the spool.

It is also desirable that fishing reels, including fly fishing reels, can be configured for a right-handed user or a left-handed user. In order to provide this versatility in a single reel, the drag system needs to be reversible in that the direction of rotation that the drag system allows and restricts should be configurable according to the needs of the user. A right-hand retrieve configuration is a reel that is configured for retrieval of fishing line by a user that winds the spool using his right hand and a left-hand retrieve configuration is a reel that is configured to allow retrieval of fishing line by a user using his left hand.

One type of drag system includes the use of a one-way bearing. One-way bearings, however, have several disadvantages. One-way bearings can freeze in cold weather and can become brittle when exposed to environmental conditions and contaminants. This, in turn, can lead to failure of the drag system. Drag systems that include one-way bearings also typically require that the one-way bearing be removed from a shaft on the reel, turned 180 degrees and reinstalled on the reel. This can lead to contamination of the bearing or even loss of the bearing if it is dropped during the process of reconfiguration. In addition, one-way bearings can be expensive and difficult to package within the space limitations of a fishing reel.

An improved fishing reel is needed that solves the problems discussed above and provides a reliable, adjustable and configurable drag system. It is, therefore, an object of the present disclosure to provide an improved drag system. Still another object of the present disclosure is to provide an improved drag system that allows for reconfiguration of the reel from right-hand retrieve to left-hand retrieve with fewer parts needing to be removed from the drag system. Still further it is an object of the present disclosure to provide an drag system that is economical to manufacture while providing reliability and ease-of-use.

BRIEF SUMMARY

One example drag system for use on a fishing reel includes a shaft and a drag unit rotatably located on the shaft and including at least one pawl that extends beyond an outer diameter of a cover of the drag unit. The drag system also includes a housing with an internal gear wherein the housing is connected to the shaft and covers the drag unit such that the at least one pawl interacts with the internal gear to restrict rotation of the housing about the shaft in one direction.

In another example, the drag system also includes a disc positioned next to the drag unit and contacting the drag unit such that when pressure is exerted axially against the disc, the drag unit is restricted from rotation about the shaft.

In another example, the drag unit includes two pawls.

In another example, the pawl in the drag unit is movable from a first operating position to a second operating position. The first operating position of the pawl restricts rotation of the housing in a first direction and the second operating position restricts rotation of the housing in a second direction opposite of the first direction.

In another example, the pawl of the drag system can be moved from the first operating position to the second operating position without removing the drag unit from the shaft.

In another example, the drag unit also includes a base connected to the cover. In this example, the pawl is connected to the base and extends outward from the base.

In another example, the drag unit also includes a biasing member. The biasing member is connected to the base and exerts a force on a surface of the pawl such that the pawl can be moved from a first operating position to a second operating position.

In one example method of the present disclosure, a method of changing a fishing reel from a right-hand retrieval configuration to a left-hand retrieval configuration includes the steps of removing a housing from a reel, moving the distal end of a pawl located on a drag unit of the fishing reel from a first operating position to a second operating position and replacing the housing on the reel.

In another example method, the steps of changing a fishing reel from a right-hand retrieval configuration to a left-hand retrieval configuration as described above can be accomplished without removing the drag unit from the fishing reel.

BRIEF DESCRIPTION OF THE SEVERAL VIEWS OF THE DRAWINGS

Certain embodiments are shown in the drawings. However, it is understood that the present disclosure is not limited to the arrangements and instrumentality shown in the attached drawings, wherein:

FIG. 6 is an illustration of the embodiment of FIG. 4 showing a first operating position and a second operating position of the present disclosure.

DETAILED DESCRIPTION

Figure 1:
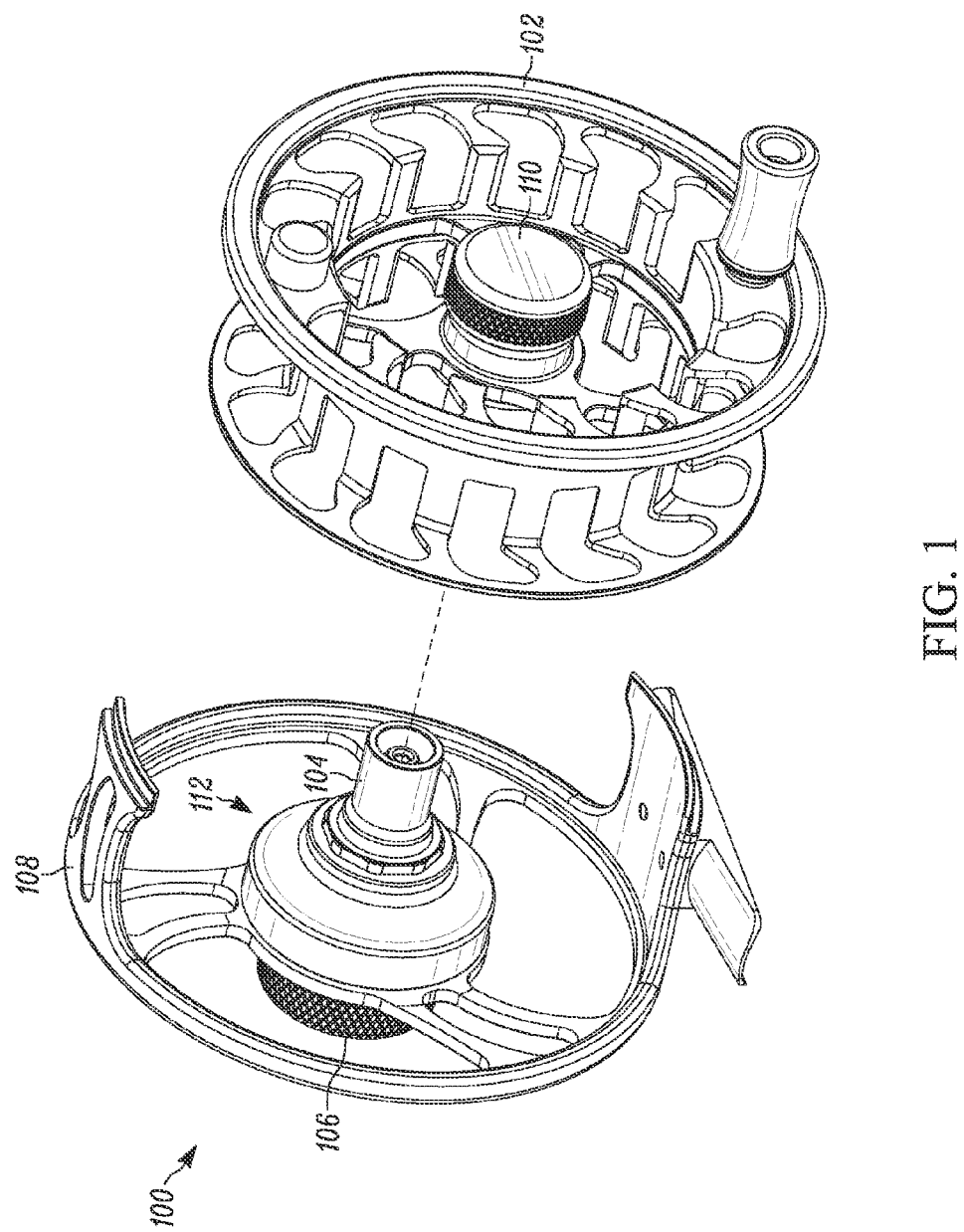
FIG. 1 is an illustration of one embodiment of a reel of the present disclosure.

For the purposes of promoting and understanding the principles disclosed herein, references are now made to the preferred embodiments illustrated in the drawings and specific language is used to describe the same. It is nevertheless understood that no limitation of the scope of the invention is thereby intended. Such alterations and further modifications in the illustrated device and such further applications of the principles disclosed as illustrated herein are contemplated as would normally occur to one skilled in the art to which this disclosure relates.

As shown in FIG. 1, a fishing reel 100 may include cage 108 and spool 102. While the subject matter discussed herein may be applied to various types of fishing reels or other devices requiring drag systems, a fly fishing reel is depicted in FIG. 1. Spool 102 is removable from cage 108. In this embodiment, spool 108 includes cap 110 that secures spool 102 onto cage 108. Any suitable method of attachment can be used. In this embodiment, cap 110 includes internal threads that engage complimentary external threads on housing 104 of drag system 112. Spool 102 has a centrally located hole that allows spool 102 to be installed over housing 104. Spool 102 and housing 104 also each include complimentary locking features such as teeth and grooves or other interfacing shapes that prevent rotation of spool relative to housing 104 after spool 102 is secured in position. In one example, as shown in FIG. 1, housing 104 includes an octagonally-shaped feature that matches a female octagonally-shaped recess in spool 102. As can be appreciated, when spool 108 is secured in place to housing 104, spool 102 will only rotate when housing 104 is rotated. In such a configuration, a drag system, such as drag system 112 discussed below, will restrict spool 102 from rotating in one direction while permitting rotation of spool 102 in an opposite direction.

Spool 102 and cage 108 can be made of any suitable material. In one example, spool 102 and cage 108 are made of aluminum. In other examples, spool 102 and cage 108 can be made from other materials such as other metals, composites, plastics and the like. Spool 102 and cage 108 can be machined, cast, or otherwise produced from a suitable material. In a preferred embodiment, spool and cage 108 are machined from aluminum bar stock.

As seen in FIG. 1, cage 108 includes drag system 112. As further detailed in FIG. 2, drag system 112 includes various components that allow the rotation of spool 108 to be restricted in one direction as described above. Drag system 112 includes knob 106, washer 204, pins 206, plate 212, disc 214, drag unit 216, shaft 228 and housing 220. As will be further described below, the elements of drag system 112 operate such that the ability of housing 220 to rotate about its central axis can controlled or restricted as desired by a user. When assembled, drag system 112 allows a user to vary the force required to spin housing 220 (and, in turn, the force required to spin spool 102). The user can adjust the force required to spin housing 220 by turning knob 106. Drag system 112 also may allow the user to change the configuration of reel 100 from a right-hand retrieve configuration to a left-hand retrieve configuration as will be further described.

Figure 2:
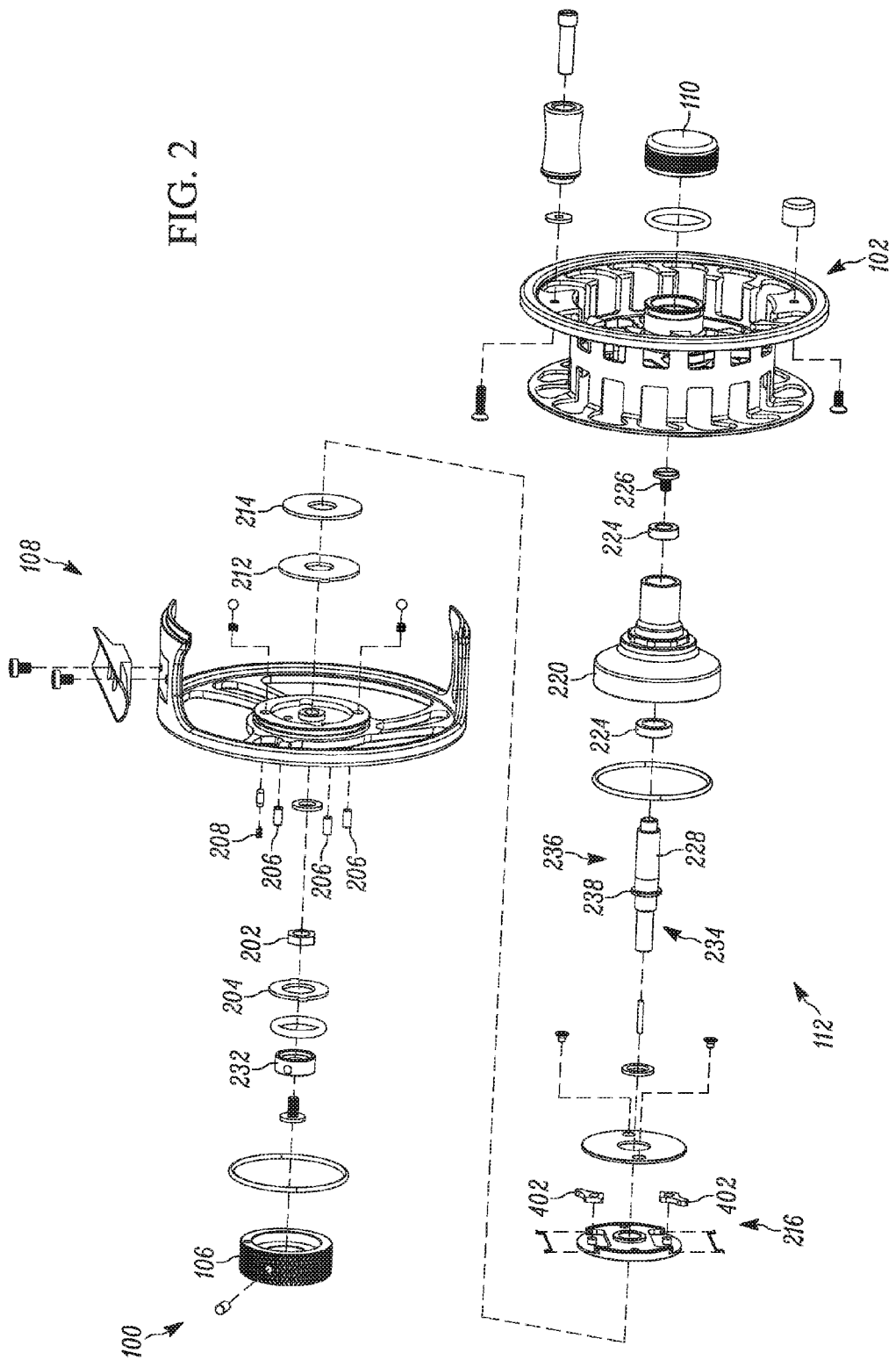
FIG. 2 is an exploded view of one embodiment of the present disclosure.

As shown in FIG. 2, drag system 112 includes shaft 228. Shaft 228 may be the central support member of drag system 112. Various other elements of drag system 112 may reside on and be retained on shaft 228. The center axis of shaft 228 may operate as the longitudinal central axis of reel 100 around which other elements may rotate during operation. Shaft 228 may be made of various materials and manufactured by many methods. In one embodiment, shaft 228 is a machined stainless steel component. In other embodiments, shaft 228 can be made of other metals, composites or plastics.

Shaft 228, in the embodiment shown in FIG. 2, includes a retained end and a free end. Retained end 234 may include external threads and internal threads and connects to cage 108. Free end 236 may include internal threads, portions of varying outer diameters and is configured to accept housing 104 and spool 102. In one embodiment, retained end 234 can be connected to cage 108 with a nut that secures retained end 234 of shaft 228 to cage 108. Shaft 228 can also be attached to cage 108 by press fitting, welding, or other suitable methods.

Further positioned on retained end 234 of shaft 228, in this embodiment, are washer 204, collar 232 and knob 106. Washer 204 is positioned over shaft 228 and collar 232 then be placed on shaft 228 such that it is threaded onto the external threads of shaft 228. In this example, as collar 232 is turned it moves axially along the central axis of shaft 228 moving washer 204 as well. To prevent collar 232 from becoming disengaged from shaft 228, a screw can be tightened into an internally threaded hole in retained end 234 of shaft 228. Knob 106 can then be placed over collar 232 and secured to collar 232 by a set screw positioned in the outer circumferential surface of knob 106. As can be appreciated, in this example configuration, as knob 106 is turned, collar 232 is turned and moves axially along a central axis of shaft 228. As also shown in FIG. 2, one or more o-rings or other sealing elements can be placed between the various elements of drag system 112. The sealing elements can be compressed between the various elements of drag system 112 so as to prevent the intrusion of water, dust or other contaminants that can degrade the performance of reel 100 and cause premature failure or malfunction.

In the embodiment shown in FIG. 2, drag system 112 can also include plate 212, disc 214, drag unit 216 and housing 220. As further shown in FIG. 2, plate 212, disc 214 and drag unit 216 can be positioned on shaft 228 between cage 108 and flange 238. In one example, flange 238 is a portion of shaft 228 that has been machined, formed or otherwise fixed to shaft 228 so that the outer diameter of flange 238 is larger than the portion of shaft 228 located between flange 238 and retained end 234. As can be appreciated, plate 212, disc 214 and drag unit 216 can be positioned on shaft 228 through central openings in plate 212, disc 214 and drag unit 216 prior to retained end 234 be inserted through cage 108 and secured in position. Since the diameter of the central openings of plate 212, disc 214 and drag unit 216 are smaller than the outer diameter of flange 238, plate 212, disc 214 and drag unit 216 are retained on shaft 228.

In one embodiment, plate 212 is a steel washer. Plate 212 is one element of drag system 112 that transfers the movement of knob 106 by a user into a change in force exerted on drag unit 216 as will be explained. Other materials and configurations of plate 212, however, can also be used. Disc 214, in one embodiment, is an annular piece of cork. Other types of material can also be used. As will be explained further below, disc 214, in one embodiment, is the element of drag system 112 contiguous to drag unit 216. As knob 106 is turned by a user, plate 212 moves axially. This movement of plate 212 exerts more pressure or force against drag unit 216 by disc 214. The material of disc 214, therefore, influences the amount of friction that exists between disc 214 and drag unit 216. As can be appreciated by one of ordinary skill in the art, materials other than cork can also be used to this end. For example, disc 214 can also be made of plastics, rubbers, composites and other materials.

Figure 3:
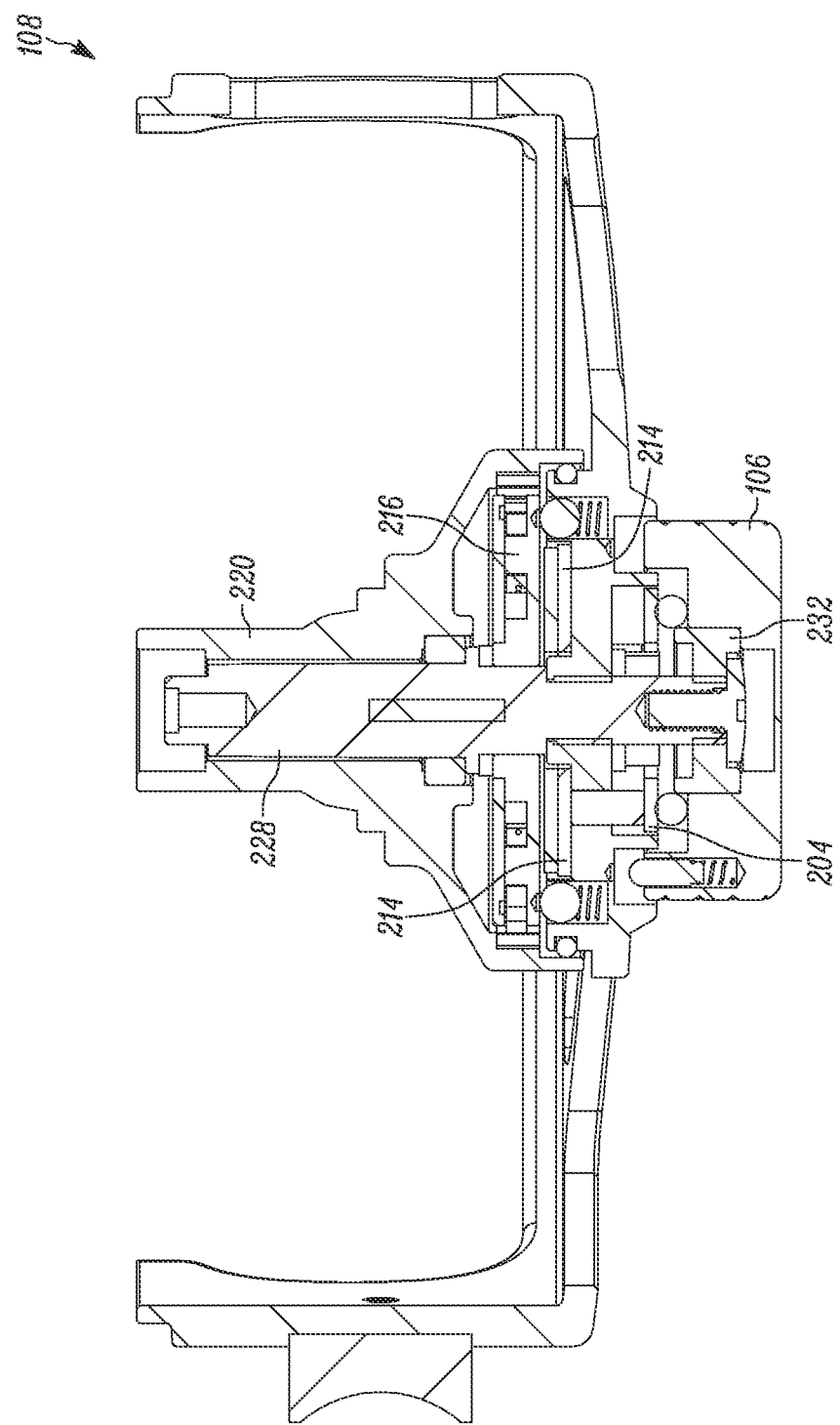
FIG. 3 is a sectional view of one embodiment of a drag system of the present disclosure.

As shown in FIG. 3 in one example, plate 212 and at least a portion of disc 214 are located in a recessed region of cage 108. Contiguous to disc 214 in this example is drag unit 216 with pawls 218. As further shown in FIG. 4, drag unit can include base 404, cover 406, pawl 402 and biasing member 408. In one embodiment, base 404 and cover 406 are machined aluminum elements. Other materials, however, can be used. Base 404 and cover 206, for example, can also be formed, cast, or molded in other metals, plastics or composites or other suitable materials.

Figure 4:
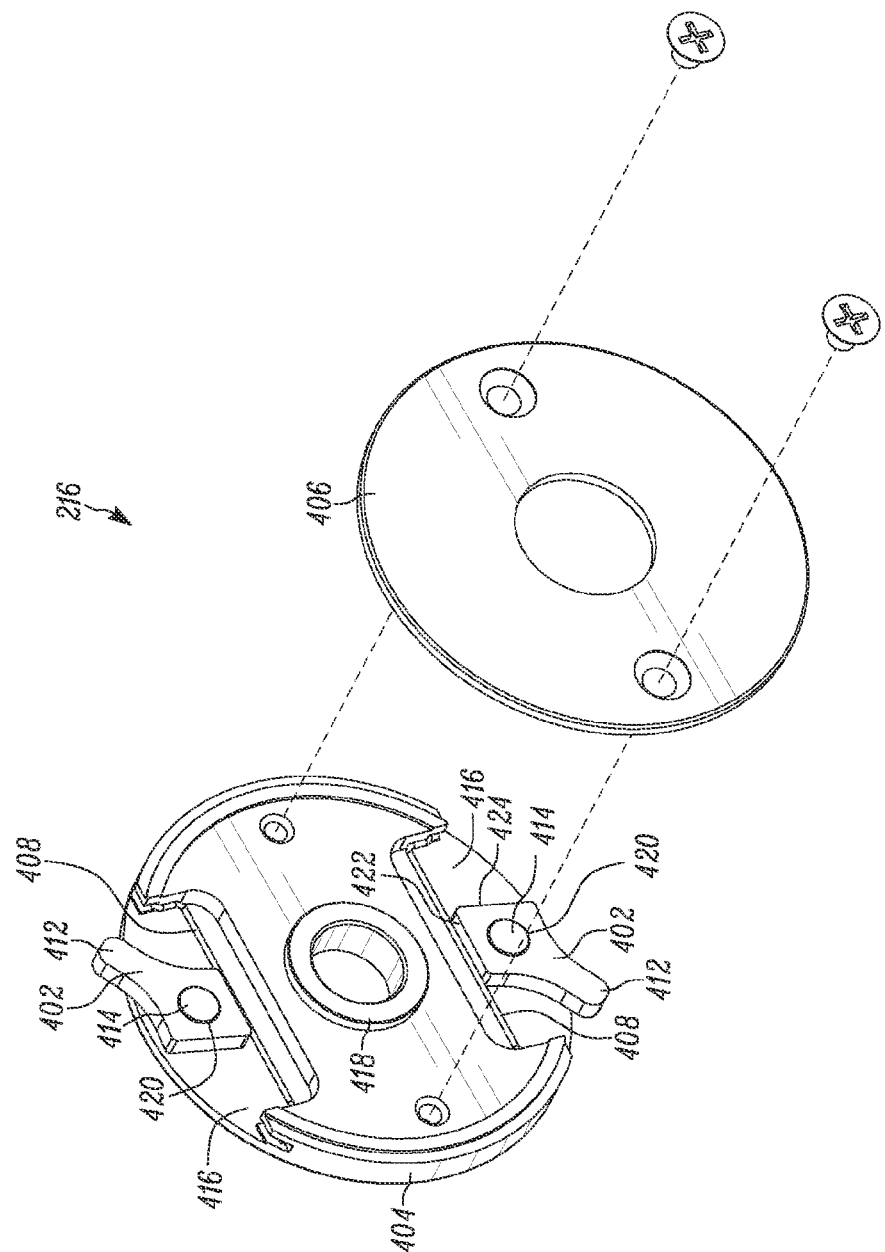
FIG. 4 is an illustration of one embodiment of a drag unit of the present disclosure.

Referring back to FIG. 4, in one example, base 404 is a circular element with a central opening and two cavities 416 located on opposing sides. Base 404, in this example, also includes post 414 located inside each of cavities 416. Cover 406, in one example, is also a circular element. Cover 406 also may include a central opening and is configured to be placed over base 404 and cover cavities 416. In the example shown in FIG. 4, the central opening of base 404 is surrounded by lip 418. The outer diameter of lip 418 and the inner diameter of the central opening of cover 406 are similarly sized so that cover 406 is located and retained in position relative to base 404. An another embodiment, as shown in FIG. 4, cover 406 may include openings through which fasteners can be inserted to attach cover 406 to base 404. In one example, the fasteners are screws that sit in beveled openings in cover 406 and attach to threaded holed in base 404. Other configurations known to one of ordinary skill in the art may also be used to retain cover 406.

In the embodiment shown in FIG. 4, drag unit 216 may also include pawl 402 and biasing member 408. Pawl 402 is the element of drag system 112 that permits and restricts the rotation of housing 220 as will be explained in more detail. Pawl 402, in this example, is a molded plastic element. However, other materials and production methods may also be used. Pawl 402 may include a distal end 412 and a foot 420. The distal end of pawl 402, in this example, is configured such that when cover is placed in its assembled position on base 404, a portion of the distal end 412 of pawl 402 extends beyond the outer diameter of base 404 and cover 406. This external portion of pawl 402 is the portion of pawl 402 that can interface or engage with an internal gear of housing 104. Foot 420, in this example, is the portion of pawl 402 that connects to post 414. As can be seen in FIG. 4, pawl 402 resides in cavity 416 of base 404 and can rotate about post 414. Foot 420 may also include a first surface 422 and a second surface 424. First surface 422 and second surface 424 are the portions of pawl 402 that interface with biasing member 408.

Biasing member 408, in one example, is a piece of spring steel that is connected at either end of cavity 416 and extends across and radially below post 414. As can be appreciated, when pawl 402 is assembled onto post 414, biasing member exerts a force against first surface 422. This force biases distal end 412 of pawl 402 to extend outward from base 404 at a predetermined angle that allows pawl 402 to interface with an internal gear 504 of housing 220. As can be appreciated, pawl 402 can still be rotated about post 414 but this rotation is resisted by the force of biasing member 408 on first surface 422. This example configuration of drag unit 216 also allows pawl 402 to be moved into a second operational position. In the second operating position, as shown in FIG. 6, pawl 402 is rotated about post 414 such that biasing member 408 rests on second surface 424 of pawl 402. In this position, the distal end 412 of pawl 402 still extends outward from base 404 but extends at an angle approximately ninety degrees away from the position of distal end 412 in the first operating position. As will be explained later, the position of pawl 402 in the first operating position and in the second operating position can restrict rotation of housing 220 in two opposite directions.

As seen in FIG. 4, drag unit 216, in this example, includes two similarly configured cavities 416, pawls 402 and biasing members 408. Other configurations of drag unit 216 can also be used. For example, more pawls could be used or other attachment configurations could be used. In addition, other configurations of biasing members including plastic, rubber, or composite materials could be used without departing from the spirit of the invention.

Figure 5B:
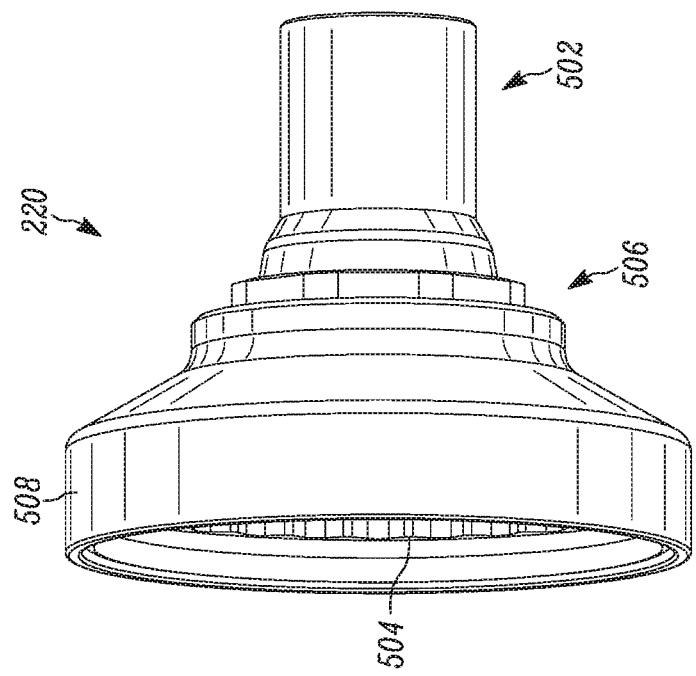
FIG. 5B is an alternate view of the example drag housing of FIG. 5A.
Figure 5A:
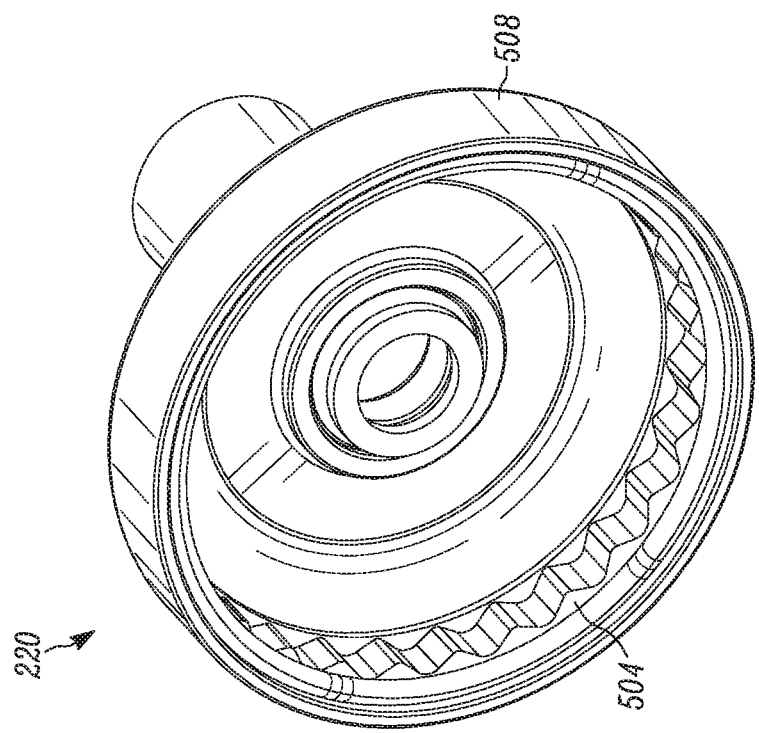
FIG. 5A is an illustration of one embodiment of a drag housing of the present disclosure.

As shown in FIGS. 5A and 5B, drag system 112 may also include housing 220. In one embodiment, housing 220 includes spool support section 502, transition section 506 and base section 508. Housing 220 can be a machined piece of aluminum but may also be formed, molded, cast or otherwise fabricated from other metals, plastics or composites. Housing 220, in one example, is hollow such that it can accept and be installed over shaft 228. One or more bearings may also be placed inside housing 220 to facilitate the rotation of housing 220 about shaft 228. As shown in FIG. 3, in one embodiment, a bearing is positioned at the end of spool support section 502 and a second bearing is positioned near the intersection of transition section 506 and base section 508. Any suitable bearing can be used such as a roller or ball bearing or the like.

Spool support section of housing 220 is the portion of housing 220 that interfaces with the spool as previously described. The top portion of spool support section 502 may include external threads to allow spool 102 to be attached thereto. Base section 508, in one example, has a larger outer diameter than spool support section 502 and is the portion of housing 220 that fits over and covers the other elements of drag system 112 such as plate 212, disc 214 and drag unit 216. Transition section 506 is the portion of housing 220 between spool support section 502 and base section 508. Transition section 506, in one example as shown in FIG. 5B, is frusto-conical in shape and provides a smooth transition from the smaller outer diameter of spool support section 502 to the larger outer diameter of base section 508. Other configurations and shapes of housing 220 may also be used.

Housing 220, in one example, may also include internal gear 504. Internal gear 504, as shown in FIGS. 5A and 5B, is positioned inside of base section 508. Internal gear 504 may include various tooth profiles and tooth sizes. In one example, internal gear 504 includes twenty-two teeth with an appropriately sized pitch and tooth height to engage the external portion of distal end 412 of pawl 402. In one example, internal gear 504 is machined into the outer wall of base section 508 of housing 220. In other examples, internal gear 508 may be separately manufactured and attached to the inside surface of base section 508.

As seen on FIG. 2, drag unit 216 (and other elements of drag system 112) fit inside of base section 508 of housing 220. An o-ring or other sealing element can be located between housing 220 and cage 108 so that the internal elements of drag system 112 are protected from environmental conditions and other contaminants. In one embodiment, drag unit 216 fits within internal gear 504 of housing 220. An outer diameter of drag unit 216 is sized to be smaller than the internal diameter of internal gear 504. In this example configuration, the external portion of pawls 402 contact internal gear 504 but a small margin is maintained between the outer diameter of drag unit 216 and the inner diameter of internal gear 504. In such a configuration, housing 220 can rotate relative to drag unit 216 about a central axis in one direction. When housing 220 spins relative to drag unit 216, pawls 402 rotate about post 414 by over coming the force exerted on pawl 402 by biasing member 408. As can be appreciated, as housing 220 rotates relative to drag unit 216, pawls 402 move over the toothed-profile of internal gear 504.

Housing 220, however, is prevented from rotating in a second direction opposite the previously described motion in this embodiment. When housing 220 attempts to rotate in an opposite direction, the teeth of internal gear 504 exert a force on pawl 402 that attempt to rotate pawl 402 about post 414 in the opposite direction. Pawl 402 is restricted from moving in this opposite direction, however, and this prevents housing 220 from rotating in the opposite direction.

The movement of housing 220 relative to drag unit 216, in the embodiment show in FIGS. 2-5, can be reversed. Reversal of the allowed and restricted rotation of housing 220 is desirable to change reel 100 from a right-hand retrieve configuration to a left-hand retrieve configuration. To change reel 100, housing 220 is removed from cage 108. Each pawl is moved from a first operating position 602 to a second operating position 604 as shown in FIG. 6. This can be accomplished, in this example, by moving the distal ends 412 of pawls 402. Housing 220 is then replaced on cage 108. In this modified configuration, pawls 402 now allow rotation and restrict rotation of housing 220 in rotation directions opposite of those directions when pawls 402 are in the first operating position. Advantageously, the change of pawls 402 from the first operating position 602 to second operating position 604 does not require drag unit 216, or any other element of drag system 112 to be removed from cage 108 except for housing 220. This simplifies the process of changing reel 100 from right-hand retrieve to left-hand retrieve configuration and also reduces the likelihood of dropping or losing individual parts of reel 100 and reduces exposure time of internal elements to the environment and other contaminants.

When drag system 112 is fully assembled on cage 110, the force required to rotate housing 220 around a central axis of shaft 228 can be varied by utilizing drag system 112. In this embodiment, as previously described, a user can change the force required to rotate housing 220 by turning knob 106. As knob 106 is turned, collar 232 moves along central axis of shaft 228 as it turns on external threads on retained end 234 of shaft 228, in this example. As collar 232 moves, so too does washer 204. As seen in FIG. 2, washer 204 is positioned next to one or more pins 206 that extend through openings in cage 108. In this manner, the movement of washer 204 translates to axial movement of pins 206. The opposite end of pins 206 can be configured to contact plate 212 located on the opposite side of cage 108. The movement of pins 206 moves plate 212 that, in turn, exerts pressure on disc 214 that then can exert pressure on drag unit 216. As can be appreciated, in this configuration, the turning of knob 106 translates into a change in pressure exerted by disc 214 on drag unit 216. As more pressure is exerted on drag unit 216, therefore, housing 220 becomes more difficult to rotate and when pressure is reduced on drag unit 216, housing 220 is more easily rotated.

While the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

The invention claimed is:

1. A drag system for use on a fishing reel comprising:
   a shaft;
   a drag unit rotatably located on the shaft and including at least one pawl that extends beyond an outer diameter of a cover of the drag unit; and
   a housing including an internal gear, wherein the housing is connected to the shaft and covers the drag unit such that the at least one pawl interacts with the internal gear to restrict rotation of the housing about the shaft in one direction;
   wherein the drag unit further comprises a base connected to the cover, the at least one pawl connected to the base and extending outward therefrom.

2. The drag system of claim 1 further comprising a disc positioned contiguous to the drag unit and contacting the drag unit such that when pressure is exerted axially against the disc, the drag unit is restricted from rotating about the shaft.

3. The drag system of claim 1 wherein the drag unit includes two pawls.

4. The drag system of claim 1 wherein the at least one pawl is movable from a first operating position to a second operating position, the first operating position restricting rotation of the housing in a first direction and the second operating position restricting rotation of the housing in a second direction opposite of the first direction.

5. The drag system of claim 4 wherein the at least one pawl can be moved from the first operating position to the second operating position without removing the drag unit from the shaft.

6. The drag system of claim wherein the drag unit further comprises a biasing member, the biasing member connected to the base and exerting a force on a surface of the at least one pawl such that the at least one pawl can be moved from a first operating position that allows movement of the housing in a first direction to a second operating position that allows movement of the housing in a second direction opposite to the first direction.

7. The drag system of claim 6 wherein the at least one pawl can be moved from the first operating position to the second operating position without removing the drag unit from the shaft.

8. A fly reel comprising:
   a cage including the drag system of claim 1; and
   a spool that is removable from the cage and configured to attach to the housing.

* * * * *